(12) United States Patent
Eichenlaub et al.

(10) Patent No.: US 10,123,555 B2
(45) Date of Patent: Nov. 13, 2018

(54) METHOD, APPARATUS AND SYSTEM FOR PRODUCING A FOOD PRODUCT

(71) Applicant: FRITO-LAY NORTH AMERICA, INC., Plano, TX (US)

(72) Inventors: Sean Eichenlaub, Plano, TX (US); Justin French, Frisco, TX (US); Christopher James Koh, Southlake, TX (US); Austin Kozman, Dallas, TX (US)

(73) Assignee: Frito-Lay North America, Inc., Plano, TX (US)

( * ) Notice: Subject to any disclaimer, the term of this patent is extended or adjusted under 35 U.S.C. 154(b) by 397 days.

(21) Appl. No.: 13/866,706

(22) Filed: Apr. 19, 2013

(65) Prior Publication Data

US 2014/0314927 A1 Oct. 23, 2014

(51) Int. Cl.
*A47J 37/12* (2006.01)
*A23L 1/01* (2006.01)
*A23L 5/10* (2016.01)
*A23L 19/18* (2016.01)

(52) U.S. Cl.
CPC .............. *A23L 1/0107* (2013.01); *A23L 5/11* (2016.08); *A23L 19/18* (2016.08); *A47J 37/1214* (2013.01)

(58) Field of Classification Search
CPC .... A47J 36/20; A47J 37/1247; A47J 37/1214; A47J 37/1219; A21B 5/08
USPC ............................ 99/403, 404, 405, 406, 407
See application file for complete search history.

(56) References Cited

U.S. PATENT DOCUMENTS

| | | | |
|---|---|---|---|
| 2,177,166 A | | 5/1938 | Bemis |
| 3,733,202 A | * | 5/1973 | Marmor ................. 426/441 |
| 3,966,983 A | | 6/1976 | Dexter |
| 4,189,994 A | | 2/1980 | Schmader |
| 4,325,295 A | | 4/1982 | Caridis |
| 4,503,127 A | | 3/1985 | Fan |
| 4,741,912 A | | 5/1988 | Katz |
| 4,844,930 A | | 7/1989 | Mottur |
| 4,923,705 A | | 5/1990 | Mottur |
| 4,929,461 A | | 5/1990 | Schonauer |
| 4,956,189 A | | 9/1990 | Johnson |
| 4,980,187 A | | 12/1990 | Johnson |
| 5,643,626 A | | 7/1997 | Henson |
| 5,846,589 A | | 12/1998 | Baker |

(Continued)

FOREIGN PATENT DOCUMENTS

| | | |
|---|---|---|
| EP | 0026565 B1 | 4/1981 |
| WO | WO 97/40712 A1 | 11/1997 |
| WO | WO 2012/104217 A2 | 8/2012 |

OTHER PUBLICATIONS

International Search Report and Written Opinion of the International Searching Authority from International Application No. PCT/2014/021992 dated Jun. 20, 2014 (8 pages).

(Continued)

*Primary Examiner* — Jimmy Chou
(74) *Attorney, Agent, or Firm* — Stephen Y. Liu; Colin P. Cahoon; Carstens & Cahoon, LLP

(57) ABSTRACT

A method and system for producing fried food pieces is disclosed. The food pieces are immersed in a first edible fluid as a product bed, monolayered, and immersed in a second edible fluid. The food pieces may also be drained in vertical orientation on a draining belt having at least one vertical orientation member.

12 Claims, 2 Drawing Sheets

(56) References Cited

U.S. PATENT DOCUMENTS

| | | | |
|---|---|---|---|
| 6,067,899 A | 5/2000 | Caridis | |
| 6,129,939 A | 10/2000 | Fink et al. | |
| 6,251,465 B1 | 6/2001 | Bello | |
| 6,558,724 B1 | 5/2003 | Caridis | |
| 6,703,065 B2 | 3/2004 | Villagran | |
| 7,074,446 B2 | 7/2006 | Heywood | |
| 7,303,777 B2 | 12/2007 | Baas | |
| 8,318,229 B2 * | 11/2012 | Desai | A23L 1/0114 426/438 |
| 8,371,568 B2 * | 2/2013 | Herrmann et al. | 270/52.16 |
| 8,372,467 B2 * | 2/2013 | Caridis et al. | 426/637 |
| 2006/0083831 A1 | 4/2006 | Caridis | |
| 2006/0088633 A1 | 4/2006 | Barber | |
| 2008/0138480 A1 | 6/2008 | Bows | |
| 2009/0297671 A1 | 12/2009 | Basker | |
| 2009/0304878 A1 | 12/2009 | Loehn | |
| 2010/0021602 A1 | 1/2010 | Caridis | |
| 2010/0051419 A1 * | 3/2010 | Desai et al. | 198/617 |
| 2012/0103764 A1 * | 5/2012 | Price et al. | 198/844.2 |
| 2013/0022719 A1 | 1/2013 | Barber | |

OTHER PUBLICATIONS

International Search Report and Written Opinion of the International Searching Authority from International Application No. PCT/US2014/035275 dated Aug. 28, 2014 (7 pages).
International Search Report and Written Opinion of the International Searching Authority from International Application No. PCT/US2014/034527 dated Oct. 27, 2014 (13 pages).

* cited by examiner

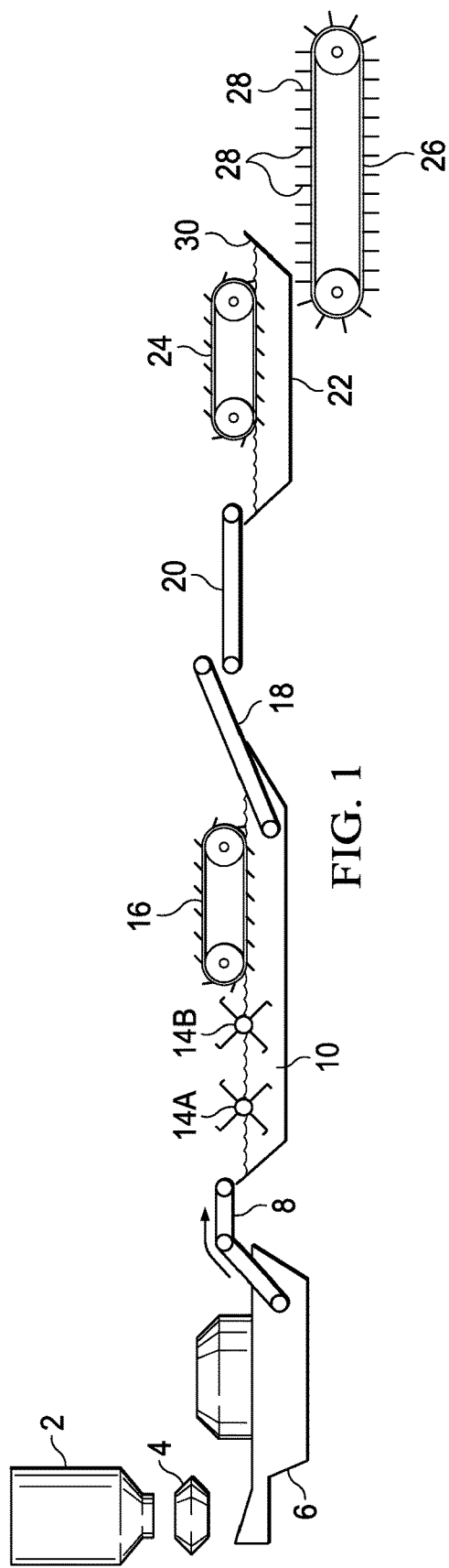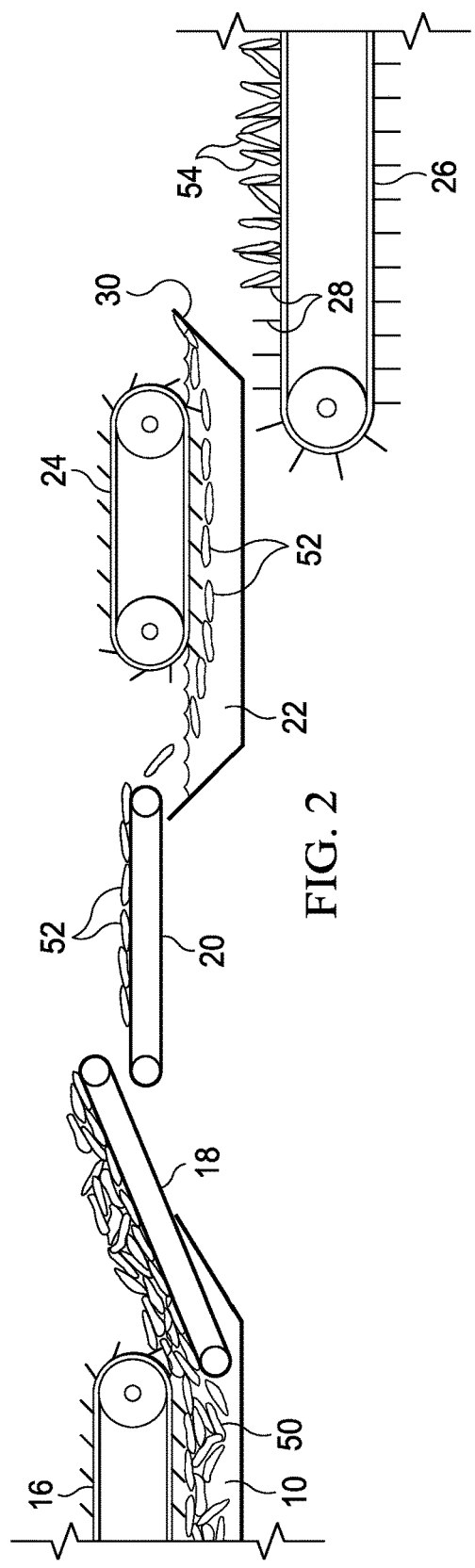

METHOD, APPARATUS AND SYSTEM FOR PRODUCING A FOOD PRODUCT

BACKGROUND OF THE INVENTION

Technical Field

The present invention relates to an improved method and system for the production of a fried snack food.

Description of Related Art

Conventional potato chip products are prepared by the basic steps of slicing peeled, raw potatoes, water washing the slices to remove surface starch and frying the potato slices in hot oil until a moisture content of about 1% to 2% by weight is achieved. The fried slices are then salted or seasoned and packaged.

Raw potato slices normally have moisture contents from 75% to 85% by weight depending on the type of potato and the environmental growing conditions. When potato slices are fried in hot oil, the moisture present boils. This results in burst cell walls and the formation of holes and voids which allow for oil absorption into the potato slices yielding significant oil contents.

The oil content of potato chips is important for many reasons. Most important is its contribution to the overall organoleptic desirability of potato chips. Too high an oil content may render the chips greasy or oily and hence less desirable to consumers. On the other hand, it is possible to make chips so low in oil that they lack flavor and seem harsh in texture. Some nutritional guidelines also indicate it is desirable to maintain a diet low in oil or fat.

Numerous attempts have been made in the prior art to reduce the oil content in potato chips. However, past attempts at producing lower oil content chips are either expensive, use technology that requires longer than desirable deoiling dwell time, or have failed to maintain the desired organoleptical properties such as taste and texture that have become familiar to consumers of traditional potato chips having higher fat or oil contents.

Consequently, a need exists for a process that enables the production of a fried food product such as a potato chip that has lower levels of oil than a traditionally fried food product, but that retains desirable organoleptic properties similar to traditional potato chips.

SUMMARY OF THE INVENTION

The proposed invention provides a method, apparatus and system for producing food pieces. In one embodiment, the method comprises providing a plurality of food pieces, par-frying said food pieces by immersion in hot oil as a product bed, wherein said hot oil comprises an initial par-fly oil temperature and a final par-fry oil temperature, to produce par-fried food pieces; removing said par-fried food pieces from said hot oil; monolayering said par-fried food pieces; and finish frying said par-fried food pieces in monolayer by immersion in hot oil at an initial finish-fry oil temperature to produce said fried food pieces.

In another embodiment, a method for making fried food products comprises providing a plurality of par-fried food pieces as a product bed; monolayering said par-fried food pieces; and finish frying said par-fried food pieces by contact with hot oil at an initial finish-fly oil temperature to produce said fried food pieces.

In another embodiment, a system for producing fried food pieces comprises a first immersion fryer using hot oil, wherein said hot oil comprises an initial par-fly oil temperature and a final par-fry oil temperature, that receives food pieces and produces par-fried food pieces as a product bed; a takeout conveyor that removes said product bed from said immersion fryer; at least one transfer conveyor that monolayers said product bed; and a second immersion fryer using oil at an initial finish-fly oil temperature that fries said par-fried food pieces in monolayer to produce fried food pieces. In still another embodiment, the system comprises a draining belt that receives said fried food pieces, wherein said draining belt comprises at least one vertical orientation member. In another embodiment, said second immersion fryer comprises a weir, wherein said fried food pieces and oil flow over said weir and onto said draining belt.

In one embodiment of the invention, a method for making food products comprises the steps of: removing food pieces from immersion in a first edible fluid as a product bed having a product bed depth on a takeout conveyor; and reducing said product bed depth on at least one transfer conveyor. In another embodiment, the at least one transfer conveyor comprises more than one transfer conveyor in series, wherein each successive transfer conveyor runs at a higher speed than its previous conveyor. The reducing step may produce said food pieces as substantially monolayered. After said reducing step, the method may further comprise immersing said food pieces in a second edible fluid.

In another embodiment, the method further comprises after the immersing step, draining said food pieces on a draining belt, wherein said draining belt comprises at least one vertical orientation member. The method may further comprise transferring said food pieces and said second edible fluid from said immersing step to said draining step over a weir and onto said draining belt. The first edible fluid can comprise oil, such that it is an immersion frying step.

In another embodiment, the second edible fluid comprises oil, wherein said immersion in said first edible fluid is a par-flying step, and wherein said immersing in said second edible fluid is a finish frying step. The par-flying step may comprise par-frying said food pieces to an intermediate moisture content of between 1.5% and about 15% by weight, wherein said finish frying step comprises finish frying said par-fried food pieces to a final moisture content of less than 2% by weight and less than said intermediate moisture content.

In another embodiment of the invention, a system for producing food pieces comprises: a first immersion tank that receives food pieces into a first edible fluid; a takeout conveyor that removes said food pieces from said first edible fluid as a product bed from said immersion fryer, wherein said product bed comprises a product bed depth; at least one transfer conveyor that reduces said product bed depth. In another embodiment, the at least one transfer conveyor reduces said product bed depth to substantially monolayered, and the system further comprises a second immersion tank that receives said food pieces from said at least one transfer conveyor in a second edible fluid, and a draining belt that receives said food pieces from said second immersion tank, wherein said draining belt comprises at least one vertical orientation member.

In another embodiment, the second immersion tank comprises a weir, wherein said food pieces and second edible fluid flow over said weir and onto said draining belt. In still another embodiment, the takeout conveyor runs at a first speed, and wherein said transfer conveyor runs at a second speed, which is greater than said first speed.

In another embodiment, the at least one vertical orientation member comprises a plurality of ribs running laterally across said draining belt, or a plurality of pins protruding from said draining belt, or a plurality of triangular fins running laterally across said draining belt. In one embodiment, the at least one vertical orientation member comprises rows of vertical orientation members running laterally across said draining belt, wherein each row comprises a height which is different than a height for each adjacent row, and optionally every other row comprises a substantially equal height.

The first immersion tank may comprise a first immersion fryer, and the second immersion tank may comprise a second immersion fryer.

In another embodiment of the invention, a system for producing food pieces comprises: an immersion tank that transfers food pieces substantially in monolayer along with a first edible fluid over a weir and onto a draining belt, wherein said draining belt comprises at least one vertical orientation member. The immersion tank may comprise a fryer.

Other aspects, embodiments and features of the invention will become apparent from the following detailed description of the invention when considered in conjunction with the accompanying drawings. The accompanying figures are schematic and are not intended to be drawn to scale. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 1 is a schematic representation of one embodiment of the method and system of the present invention.

FIG. 2 is a zoomed in schematic representation of one embodiment of the method and system of the present invention.

DETAILED DESCRIPTION

Figure 3:
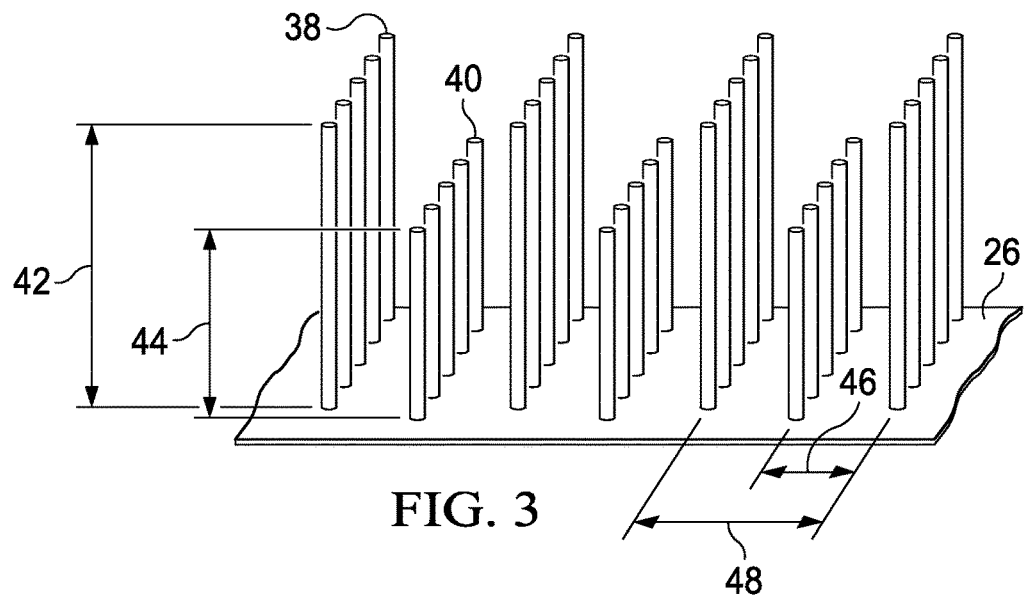
FIG. 3 is a perspective view of a portion of the draining belt in one embodiment of the present invention.

The present invention is, in one embodiment, directed to a two-stage method, apparatus and system for producing fried food products with reduced oil content. In general, when food products are fried in hot oil, moisture leaves the food product as steam, and the food product absorbs some of the oil in which it is fried. The embodiments described below are directed towards fried potato slices, but the invention in its broadest application applies to a wide variety of food products that are processed by being immersed in edible fluids. With respect to fried food products, the invention is designed to reduce, but not eliminate, the overall oil content of the finished food product.

Whole potatoes stored in hopper 2 are dispensed into a slicing apparatus 4 which drops potato slices into a water wash 6. The wash step is optional. The optionally washed slices are then fed by feed conveyor 8 into a fryer 10.

In a preferred embodiment, the frying oil entering the fryer 10 is maintained at an initial temperature between about 320° F. to about 380° F., and more preferably between about 335° F. and about 370° F. Any conventional frying medium can be used in accordance with various embodiments of the present invention, including frying mediums with digestible and/or non-digestible oils. In one embodiment, the fryer is a continuous single flow or multizone fryer which utilizes devices such as paddle wheels, 14A and 14B, and a submergible conveyor belt 16 to control the flow of potato slices (not shown) through the fryer 10.

Because the present invention can be applicable to foods other than sliced potatoes, the aspects of the invention involving frying and post-frying processing may now be described generally as pertaining to food pieces. Food pieces can include whole, pieces or slices of a variety of fruits and vegetables, as well as legumes, nuts and seeds. Food pieces can also include fabricated chip products such as fabricated potato chips and tortilla chips. Food pieces may also include extruded collets made from corn meal or other starchy ingredients, which may be direct expanded extruded products or non-expanded extruded products.

In one embodiment of the present invention, the potato slices or food pieces are par-fried to an intermediate moisture content and then removed from the fryer, preferably by a perforated endless belt conveyor 18 (sometimes referred to as a takeout conveyor; the terms belt and conveyor are used interchangeably herein). If no hot oil is added to the frying oil or if the oil is not otherwise heated during frying, at the location the perforated endless belt conveyor 18 contacts the frying oil, the frying oil comprises a final par-fly temperature of between about 250° F. to about 350° F. and more preferably between about 270° F. to about 320° F. The final par-fry oil temperature, as that term is used herein, of the first immersion frying step is the oil temperature at the location of the takeout means. For a continuous frying process, the takeout means will typically comprise a takeout conveyor 18, as depicted in FIG. 1, and for a batch process the takeout means will typically be a perforated basket or takeout conveyor. In either case, the final par-fly oil temperature is the temperature of the oil at the location of the food pieces as they are being removed from the oil by the takeout means.

In one embodiment, the potato slices exit the fryer comprising an oil content of between about 30% and about 45% by weight, and an intermediate moisture content above 2% by weight, or in another embodiment above 3% by weight. In one embodiment, the intermediate moisture content is between about 1.5% and about 15% by weight, or in another embodiment, between about 3% and about 10% by weight, or combinations of the foregoing ranges. In a preferred embodiment, the par-fried food pieces comprise an intermediate moisture content between about 2% and 10% by weight, and most preferably between about 3% and 6% by weight. Preferably, the final moisture content of the food pieces is less than about 10%, and more preferably less than about 5%, by weight of the food products below the intermediate moisture content of the food pieces. The intermediate moisture content should be low enough that the food pieces are separable from one another, and stiff enough to survive interacting with the higher speed transfer conveyor.

Intermediate moisture content serves as a good proxy for the separability and stiffness of the food products being fried.

As shown in FIG. 1, the slices are then subjected to a finish frying step, which in a preferred embodiment, is accomplished by a second immersion frying step occurring in finish fryer 22, which is fed by takeout conveyor 18 and transfer conveyor 20. The finish fryer 22 comprises a submerger belt 24. In one embodiment that utilizes a hot oil finish frying step, the temperature of the oil inside the finish fryer 22 is greater than the final par-fry oil temperature of the first immersion frying step.

In a preferred embodiment, the fried food pieces are fed from the finish fryer 22 onto a draining belt 26. The draining belt comprises at least one vertical orientation member 28. In one embodiment, the vertical orientation members protrude from the surface of the draining belt 26 a distance sufficient to prop food products up in a non-horizontal, vertical or substantially vertical position.

FIG. 2 depicts a zoomed in view of one embodiment of the apparatus and system of the present invention in use frying potato chips. A portion of the submerger belt 16 of the fryer 10 is shown. Underneath the submerger belt 16 is the product bed 50. Typically, in commercial scale snack chip fryers, the chips travel through at least a portion of the fryer as a product bed, which can be between 3 and 12 inches thick. As shown in FIG. 2, at the end of the frying process, the products are also removed by a takeout conveyor 18 as a bed of product.

Also depicted in FIG. 2 is transfer conveyor 20. Transfer conveyor 20 is run at a higher speed than takeout conveyor 18 in order to reduce the thickness or depth of the product bed. In a preferred embodiment, transfer conveyor 20 substantially monolayers the individual par-fried potato chips 52 before they are fed into the finish fryer 22. As used herein the term "substantially monolayered" (and similar terms), when applied to food pieces, means that no more than about 25% of the surface area of any food piece is covered by an adjacent food piece. Even if the term monolayered is used by itself, it is understood that an element of randomness is present in how the food pieces interact with the conveyors, and in a commercial setting there will likely be at least some small level of food piece overlap in a product bed that is referred to as a monolayered product bed.

In other embodiments, more than one transfer conveyor is arranged in series to monolayer and/or feed the par-fried potato chips into the finish fryer. When more than one transfer conveyor is used, each successive transfer conveyor in the series can be run at a higher speed than the previous conveyor. Two or more transfer conveyors may be needed when the product bed depth is large enough that a single transfer conveyor is insufficient to reduce the depth to a monolayer in one step. For example, one transfer conveyor may reduce the bed thickness from six inches to three inches, and a second transfer conveyor running at an even higher speed may reduce the bed thickness to substantially monolayered or monolayered. In a preferred embodiment, the transfer conveyor runs at a linear speed about ten times higher than the linear speed of the takeout conveyor.

The monolayering step serves several important functions in the two stage frying process of the present invention. First, it ensures that substantially all surfaces of the par-fried potato chips encounter the oil used in the finish frying step, promoting final product uniformity and enabling tighter control over the final oil content of the snack chips. Products fried in bed form experience a temperature gradient through the depth of the bed, which results in non-uniformity between products found near the top of the bed and products found near the bottom. With the present invention, a substantial match between oil flow velocity in the direction of travel in the finish fryer and the linear velocity or speed of submerger belt 24 in the finish fryer allows the par-fried food products 52 to travel through the finish fryer substantially as a monolayer. Second, the monolayering step enables effective vertical alignment of the final product on the draining belt 26. Products transferred to the draining belt in bedded form would not fall between the vertical alignment members as efficiently as a monolayered or substantially monolayered product. Third, monolayered chips can be fried in a fryer comprising a shallower depth than prior art fryers. This allows a smaller volume of oil to be used to fill the finish fryer, thereby reducing material and equipment costs.

FIG. 2 also depicts a portion of the draining belt 26. In the embodiment shown in FIG. 2, the monolayered chips 52 are fed to the draining belt 26 by flowing, along with hot oil from the finish fryer 22, over a weir 30 and cascading down onto the draining belt 26. When the spacing and length of the vertical orientation members is correct, the fried potato chips 54 are in non-horizontal, substantially vertical, or vertical in alignment. Such non-horizontal alignment allows oil to drain from both sides of the potato chip, through the belt, and out of the product stream. In the prior art, the product is removed from the fryer as a product bed. Consequently, oil draining from chips near the top of the bed would fall onto chips underneath them in the bed, vastly increasing the chances that the bottom chips would absorb the oil before it can exit the product stream. Moreover, the alignment of chips in the product bed is random, which causes non-uniform draining and wider variation in oil content between chips.

The fried potato chips may also be removed from the finish fryer in monolayer without vertical orientation. This case is not ideal because oil will drain more readily from the bottom surface than it will from the top surface, where oil is more likely to pool and absorb into the chip, and generally will drain less efficiently from both surfaces. The embodiment of the present invention that vertically orients the fried potato chips avoids these problems and provides for increased draining with reduced variability between products.

The vertical orientation members 28 can comprise any member extending from the outer surface of the draining belt 26 which disrupts the fried potato chips and prevents them from resting on the outer surface of the draining belt in a horizontal or substantially horizontal orientation. In a preferred embodiment, the vertical orientation members comprise a plurality of ribs that run laterally or transversely across the width of the draining belt. Many other structures are possible, such as a plurality of rods spaced in the machine and transverse directions along the belt.

Figure 4:
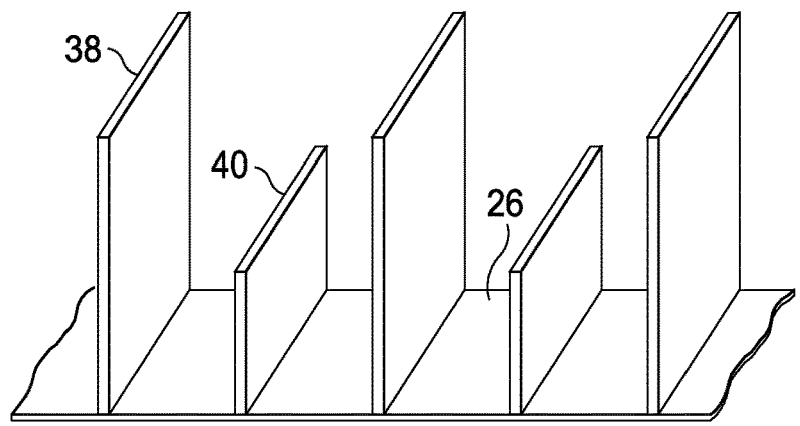
FIG. 4 is a perspective view of a portion of the draining belt in another embodiment of the present invention.
Figure 5:
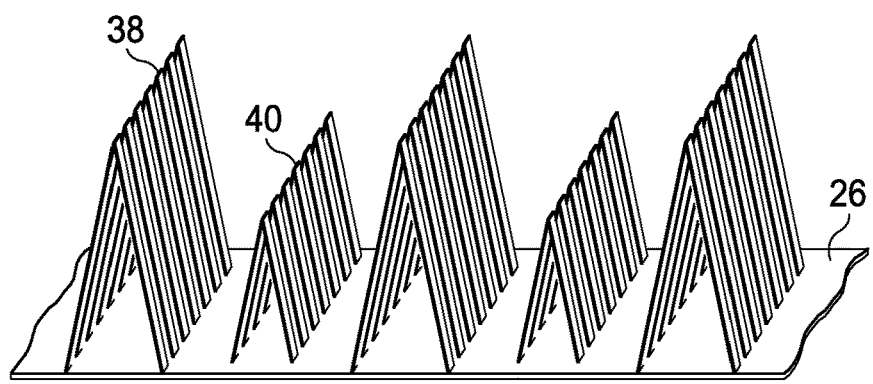
FIG. 5 is a perspective view of a portion of the draining belt in still another embodiment of the present invention.

FIGS. 3, 4 and 5 depict partial sections of different embodiments of draining belt 26 with vertical orientation members 38 and 40 protruding from it. As depicted therein, adjacent rows of vertical orientation members 38 and 40 have different, alternating heights 42 and 44 respectively.

In the embodiment depicted in FIG. 3, the vertical orientation members comprise rods that protrude from the surface of the draining conveyor. The rods are arranged into rows that run transversely across the width of the draining belt, and which are substantially equal in height along each row. However, the height of each adjacent row is different, and preferably alternates such that the heights of every other row are substantially equal, with shorter rows interposed between higher rows. Other arrangements and dimensions for the rods are possible. For example, adjacent rods in each transverse row, or rods adjacent between rows, may vary or alternate in height.

In the embodiment depicted in FIG. 4, the vertical orientation members comprise ribs that run laterally or transversely across the width of the draining belt. Preferably, the heights of each adjacent rib alternates between short and tall, as with the embodiment depicted in FIG. 3, with every other rib being equal in height, and shorter ribs being interposed between higher ribs.

In the embodiment depicted in FIG. 5, the vertical orientation members comprise triangular fins that run across the width of the draining belt. Preferably, again, the heights of the fins alternate between short and tall, as described for the embodiments shown in FIGS. 3 and 4.

The embodiments depicted in FIGS. 3-5 that utilize vertical orientation members of alternating heights are advantageous over the embodiment shown in FIGS. 1-2 that utilize vertical orientation members of substantially equal heights because the alternating heights embodiments reduce the likelihood that fried products will bridge the tops of adjacent vertical orientation members and not fall between the vertical orientation members to align vertically on the draining belt. Preferably, the spacing 48 between each tall row is larger than the major diameter of the food pieces (usually, potato slices) being drained. The major diameter of a food piece is the longest line segment that can be drawn with endpoints that border the outer surface of the food piece. When the spacing between each tall row is larger than the major diameter of the food pieces being drained, any food piece that falls and impacts the draining belt in non-vertical orientation, it will hit a tall row and be deflected into vertical orientation, rather than bridging two adjacent rows of vertical orientation members. This allows the spacing 46 between adjacent rows of vertical orientation members to be closer together without risk of significant bridging. Closer spacing between adjacent rows enables a higher density of vertically oriented chips to be captured on the draining belt.

In one embodiment, the spacing 48 between rows of vertical orientation members can be between 0.5 inches and 1.5 inches. In another embodiment, the taller vertical orientation members can comprise a height between 1.75 inches and 3 inches, and the shorter vertical orientation members can comprise a height between 1.5 and 2.5 inches.

Another important aspect of one embodiment of the invention is that the monolayered products are fed to the draining conveyor by cascading along with a volume of oil over a weir. When a cascading weir is used, both oil and fried potato chips fall down together onto the draining conveyor. The cascading oil transfer method confers additional advantages to the draining process. First, the fried potato chips are presented to the draining belt in substantially vertical orientation. Second, because the hot oil and fried potato chips are in contact with one another during the transfer from the finish fryer to the draining belt, draining does not begin until the chips engage the draining belt, at which time they are already in a non-horizontal orientation, and the hot oil passes through the perforations in draining belt. This arrangement increases draining efficiency because it allows for minimal cooling time between when the product exits the finish fryer and the beginning of the draining process. As described below, oil absorption into the potato chip is minimized at higher product temperatures. In one embodiment, the oil recovered from below the draining belt can be recycled, reconditioned, or reused at other points in the frying process.

In an alternative embodiment, the food products are removed from the second fryer in substantial monolayer on a takeout conveyor as previously described, without use of a cascading weir. In this embodiment, the vertical orientation members move from a retracted position to an extended position, upward through the outer surface of the takeout conveyor or subsequent conveyor. The movement/extension of the vertical orientation members would disrupt the fried food pieces and vertically orient them after they have been removed from the frying step by a takeout conveyor.

Applicants have determined the vapor pressure of water inside a potato slice at different product temperatures and moisture contents. It was found that in order to maintain the vapor pressure inside the potato chip above 14.7 psia (or approximately atmospheric pressure), the product temperature must be above about 270° F. to 310° F. at moisture contents ranging from 1% to 2% moisture content. Therefore, Applicants theorize that the product temperature must be at least this high in order for water vapor inside the potato chip to resist the absorption of oil via capillary action. In fact, the product temperature must likely be even higher than these temperatures to overcome gravitational and capillary forces that may also favor absorption of oil, and will certainly need to be higher if water vapor is used to expel oil from the void spaces within the potato chip. Moreover, the oil temperature must be higher than the desired product temperature to account for the commercially needed high rates of heat transfer between the oil and the product. In fact, Applicants have discovered that when an oil temperature of 340° F. is used in the finish frying step, no oil is removed or absorbed in the final product as compared to products that are fried to their final moisture content in one frying step. By contrast, a finish frying oil temperature of 290° F. causes more oil to be absorbed by the final product, and a finish frying oil temperature of 390° F. causes less oil to be absorbed in the final product.

In one embodiment, the temperature of the hot oil used for the finish frying step is at least about 350° F., and in a preferred embodiment at least about 385° F. In a preferred embodiment, the temperature of the hot oil in the finish frying step is greater than 340° F. and less than 415° F. In another embodiment, the difference between the final par-fry oil temperature in the first frying step and the initial finish-fry oil temperature in the finish frying step is at least 30° F. In a preferred embodiment, the difference is at least 50° F.

For par-fried potato slices, preferably the residence time in the second immersion fryer is less than about 10 seconds, and more preferably less than about 5 seconds, to bring the moisture content of the potato slices to a final moisture content of less than 2% by weight for washed potato slices, and less than about 2.5% by weight for unwashed kettle-style potato chips.

Applicants have discovered that the inventive process has several surprising advantages over known frying methods.

First, the fried food products that are produced by the invention comprise a lower oil content than food products subjected to known immersion frying processes. In one embodiment, potato slices produced by the inventive method comprise an oil content of less than about 28%, whereas potato slices produced using only one immersion frying step would comprise an oil content of about 35%. This result was surprising because the inventive fried food products also have flavor, color and texture characteristics similar to fried food products produced by known frying methods.

The monolayering and vertical orientation methods and equipment can be combined with a hot oil finish frying step to synergistically reduce oil content in fried food products. Without being limited by theory, the hot oil finish fry step reduces oil content for several reasons.

The viscosity of frying oil generally decreases with increasing temperature. Applicants believe that the hotter oil used in the finish frying step of the present invention drains more efficiently from the slices.

The hot oil also likely causes a rapid increase in chip temperature which converts most of the water remaining inside the potato slices into steam, which exits the slices. Applicants believe that this steam also ejects a portion of the oil that had been absorbed into the slice during immersion frying. Applicants have observed that when typical potato slices are fried using previous immersion frying methods, after a residence time in the oil of between about 80 seconds and 130 seconds, the bubbling of potato slices inside the fryer slows substantially—a point referred to as the bubble end point. The bubble end point will vary according to potato slice (or generally food product) characteristics and oil temperature, but regardless of conditions the bubble end point is visually perceptible by a skilled artisan. Applicants believe that at this point, the remaining water inside the potato slices has stopped converting to steam as efficiently as before, and oil starts absorbing into the potato slices after the bubble end point. As described herein, in one embodiment Applicants propose to remove the potato slices from the first frying step before or shortly after the bubble end point, and subject them to a short time/higher temperature finish frying step to remove the remaining water and reduce the oil content of the final product. In one embodiment, the potato slices are removed from the first frying step within about 10 seconds of (before or after) the bubble end point. In another embodiment, the potato slices are removed from the first frying step less than about 50 seconds after the bubble end point, and in a preferred embodiment less than about 30 seconds after the bubble end point. Applicants have found that when the potato slices are then transferred to a hotter oil finish frying step, the potato slices bubble rapidly as the water remaining in the slices is converted to steam.

Second, the equipment used to carry out the inventive method can be easily retrofitted onto existing frying equipment. Equipment that can be retrofitted reduces the capital costs of implementing the inventive method. Perhaps more importantly, the inventive method can dramatically increase the capacity and throughput of existing frying equipment. As stated above, the immersion frying time for potato chips can be reduced from about 190 seconds to between 80 and 130 seconds (preferably, between about 100-120 seconds). Such a reduced frying time could allow an existing fryer that has the capacity to produce 6,000 pounds of fried food pieces per hour, when modified according to the present invention, to produce up to 10,000 pounds per hour of fried food pieces. Finally, because the food products spend less time in the frying oil, and because the fryer has increased throughput, the quality of the oil will be consistently higher because of the lower duty cycle and potentially higher fresh oil replenishment rate.

The inventive method can also be coupled with a post-fry dehydration step. Shelf-stable snack foods are dried to a moisture content below about 2% by weight, or below about 1.5% by weight. In one embodiment, the food pieces described above are finish fried to a moisture content above about 2% by weight, and then subjected to a drying step that dehydrates the food pieces to a moisture content below about 2% by weight, or below about 1.5% by weight. In various embodiments, the drying step can be one or a combination of hot air drying, microwave drying, infrared drying, or impingement drying. The monolayering aspect of the present invention may be particularly useful for a microwave drying step because monolayering of food products is important in producing uniform products made by microwave drying, where shielding is a problem. Other non-frying drying methods which are known in the art can be used.

The inventive method can also be coupled with a post-fry steam or air stripping step. Vertically oriented food pieces, especially potato slices, will drain more efficiently due to gravity, but any assisted draining technologies, such as steam stripping or air stripping, would also see oil removal efficiency gains.

EXAMPLES

Control samples of potato chips were made by washing, peeling and slicing potatoes as is known in the art. The potato slices were then washed to remove surface starch. The control slices were fried in a continuous immersion frying process at an initial oil temperature of 353° F. for about 190 seconds to a final moisture content below about 2% by weight. The resulting control potato chips had an oil content of about 36% by weight of potato chips.

Experimental potato chips were produced by washing, peeling and slicing potatoes as is known in the art. The potato slices were then fried in a two stage continuous fryer, with monolayering between the first and second frying stages using a higher speed transfer conveyor, as described above. Three different experiments were run using draining belts that comprised vertical orientation members substantially as shown and described with reference to FIGS. 3-5. When the embodiments shown in FIGS. 4 and 5 were used, the potato chips comprised an oil content of about 32% by weight. When the embodiment shown in FIG. 3 was used, the potato chips comprised about 33% oil by weight.

The foregoing description and examples illustrate the principles of the invention in its broadest respect, which involves the handling of food pieces that undergo one or more immersion steps in an edible fluid. Examples of such processes include water blanching and oil blanching. Therefore, in one embodiment, a system comprises a takeout conveyor that removes food pieces from immersion in an edible fluid as a product bed, wherein said product bed comprises a depth, and a transfer conveyor that receives said product bed from said takeout conveyor and reduces said product bed depth. In another embodiment, the transfer conveyor reduces the bed depth by operating at a speed that is less than the takeout conveyor speed. In one embodiment, the system comprises one or more additional transfer conveyors in series which further reduce the product bed depth, where the final product depth may be a monolayer or substantially monolayered. The reduced bed depth product can then be fed into further processing steps.

In one embodiment, the one or more transfer conveyors feed a substantially monolayered food product bed into a second immersion step, during which the food products travel from the transfer conveyor end to an opposite end while immersed or floating in an edible fluid. The food products can flow, along with edible fluid, over a weir and onto a draining belt. Characteristics of different embodiments of the draining belt were described previously.

It will now be evident to those skilled in the art that there has been described herein a method and system that can be used to produce food products that require one or more immersion steps. Although the invention hereof has been described by way of a preferred embodiment, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

In sum, while this invention has been particularly shown and described with reference to a preferred embodiment, it will be understood by those skilled in the art that various changes, in form and detail may be made therein without departing from the spirit and scope of the invention.

What is claimed is:

1. A system for producing food pieces comprising:
    a first immersion tank that receives said food pieces into a first edible fluid;
    a takeout conveyor that removes said food pieces from said first edible fluid as a product bed from said first immersion tank, wherein said product bed comprises a product bed depth;
    at least one transfer conveyor that reduces said product bed depth to substantially monolayered;
    a second immersion tank that receives said food pieces from said at least one transfer conveyor in a second edible fluid; and
    a draining belt that receives said food pieces from said second immersion tank, wherein said draining belt comprises a plurality of vertical orientation members, each of which are spaced a predetermined distance apart from an adjacent vertical orientation member, wherein the predetermined distance is less than a major diameter of the food pieces to prevent any of the food pieces from resting on an outer surface of the draining belt in a horizontal orientation.

2. The system of claim 1 wherein said second immersion tank comprises a weir located above the draining belt, wherein said food pieces and the second edible fluid cascade over said weir and onto said draining belt.

3. The system of claim 1 wherein said takeout conveyor runs at a first speed, and wherein said at least one transfer conveyor runs at a second speed, which is greater than said first speed.

4. The system of claim 1 wherein said plurality of vertical orientation members comprises a plurality of ribs running laterally across said draining belt.

5. The system of claim 1 wherein said plurality of vertical orientation members comprises a plurality of pins protruding from said draining belt.

6. The system of claim 1 wherein said plurality of vertical orientation members comprises a plurality of triangular fins running laterally across said draining belt.

7. The system of claim 1 wherein said plurality of vertical orientation members are arranged in rows extending laterally across said draining belt, wherein each row comprises a height which is different than a height for each adjacent row.

8. The system of claim 7 wherein every other row comprises a substantially equal height.

9. The system of claim 1 wherein said first immersion tank is a first immersion fryer.

10. The system of claim 1 wherein said second immersion tank is a second immersion fryer.

11. A system for producing food pieces comprising:
    an immersion tank having a weir;
    a draining belt located beneath the weir; and
    wherein the immersion tank transfers the food pieces substantially in monolayer along with a first edible fluid over the weir and cascading onto the draining belt, wherein said draining belt comprises a plurality of vertical orientation members spaced apart a predetermined distance that prevents the food pieces from resting on an outer surface of the draining belt in a horizontal orientation.

12. The system of claim 11 wherein said immersion tank is a fryer.

* * * * *